July 7, 1925.
E. K. H. LUNDBERG
SELF CLOSING VALVE
Filed March 18, 1924
1,545,150
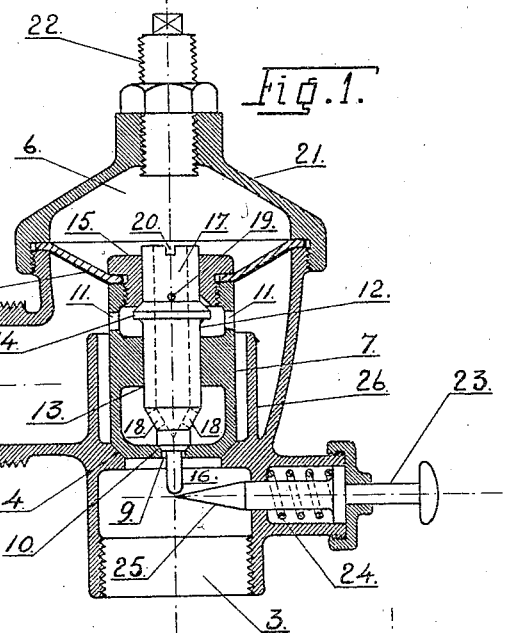
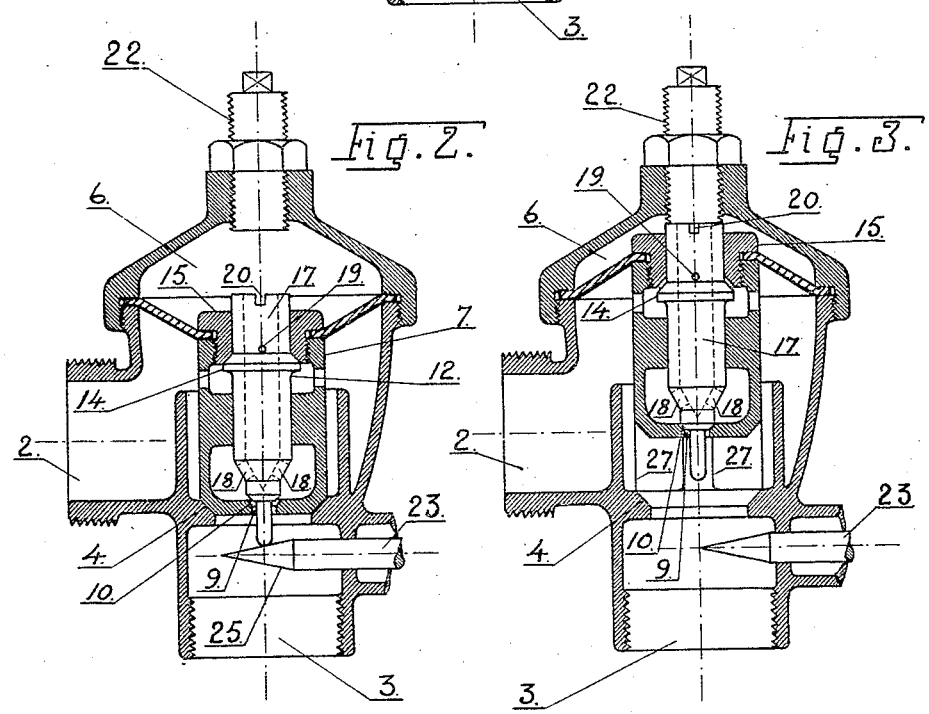
Inventor
E. K. H. Lundberg
By Marks & Clerk
Attys.

Patented July 7, 1925.

1,545,150

UNITED STATES PATENT OFFICE.

ELOF KARL HJALMAR LUNDBERG, OF SALTSJOBADEN, SWEDEN.

SELF-CLOSING VALVE.

Application filed March 18, 1924. Serial No. 700,147.

*To all whom it may concern:*

Be it known that I, ELOF KARL HJALMAR LUNDBERG, a subject of the King of Sweden, residing at Saltsjobaden, Sweden, have invented certain new and useful Improvements in Self-Closing Valves, of which the following is a specification.

The self-closing and shock-preventing valve for letting through a predetermined quantity of water (or other liquid), stated in the U. S. Letters Patent No. 1,431,406, comprises, besides other parts, a differential piston, movable in the valve box and contributing to the operation of the valve. The provision of a differential piston, however, has proved unsuitable under certain circumstances, especially when the valve is used for letting through liquids, containing impurities.

For removing the said disadvantage a flexible diaphragm fixed in the valve box, according to this invention has been substituted for the said differential piston, a hollow valve body being fixed to the said diaphragm, which valve body, as the valve is closed, fits tightly to a seat provided in the valve box at the outlet side of the same. In the said valve body a movable valve spindle is provided, which, when so actuated from the outside, that it moves in the valve body, occupies such a position in the same, that the lower side of the diaphragm is subjected to a surplus of pressure effected by the liquid in the admission conduit, owing to which fact the valve body, which normally closes the outlet opening of the valve, is automatically moved from its seat, so that the valve is opened. During the last part of the said movement the valve spindle impinges against an abutment provided in the valve box, the position of the same in the valve body being thereby so changed, that the surplus of pressure on the lower side of the diaphragm ceases, so that the valve body automatically moves towards its seat and the valve is closed. Through this modification a valve has been attained, which compared with valves of the previous construction possesses essential advantages and is insensible to impurities contained in the liquid.

In the accompanying drawing a valve according to one form of the invention is shown in vertical section. Figs. 1, 2 and 3 show the principal parts of the valve in three main positions.

The valve box 1 has an inlet 2, an outlet 3 and a valve seat 4. In the valve box a flexible diaphragm 5 is provided, to which is fixed a hollow valve body 7, which is so arranged, that it fits tightly to the seat 4. The diaphragm 5 and the valve body 7 fixed to the same serve as the lower part of a chamber 6 in the valve box. The valve body 7 has a valve opening 9 and an appertaining valve seat 10 and apertures 11. A valve spindle 12 moves tightly in an opening 13 in the valve body 7 and is provided with an annular projection 14, which fits tightly against a sleeve 15, which is tightly screwed into the valve body 7 and by means of which the diaphragm is fixed to the valve body. The lower part of the valve spindle fits tightly against the seat 10, and a downward extension 16 thereof projects down through the valve opening 9. In the valve spindle 12 is arranged a channel 17, from which holes 18 and 19 extend, and in its upper end there is a groove 20.

A cover 21 tightly closes the upper part of the valve box 1 and between the said cover and the valve box the outer edge of the diaphragm 5 is jammed. In the cover 21 an adjusting screw 22 is screwed.

A pressure spindle 23 runs in a sleeve on the valve box. The said spindle, after it has been pressed inwards, is restored to its original position by a spring 24. The tip of the inner, conical end 25 of the spindle 23 is situated immediately under the extension 16 of the valve spindle.

The valve box is provided with an inner tubular projection 26, located above the valve seat 4 and provided on its inner side with flanges 27 guiding the valve body 7 while moved in the valve box. The channels, bounded by the said flanges 27, the tubular projection 26 and the valve body 7, determines the outflow area of the valve.

The valve acts in the following way. When it is closed, as shown in Fig. 1, there is in the chamber 6 above the diaphragm a pressure equal to the pressure in the water pipe system, owing to the existence of the apertures 11 in the valve body 7 and hole 19 and the channel 17 in the valve spindle 12. The same pressure also prevails, owing to the occurrence of the channel 17 and the holes 18 in the valve spindle 12, in the hollow part of the valve body 7. By virtue of the tight fit of the valve body 7 against the valve seat 4 and the tight fit of the valve spindle 12 against the valve seat 10 the valve is kept closed. When the valve is to be opened, the spindle 23 is pressed inwards, as shown in Fig. 2. The conical end 25 of the pressure spindle 23 then lifts the valve spindle 12, so that it ceases to fit tightly against the valve seat 10, while on the other hand a tight fit between the projection 14 and the sleeve 15 ensues, and this tight fit is maintained by the pressure acting on the annular projection 14. The connection between the chamber 6 above the diaphragm and the inlet 2 through the hole 19 will then be cut off, and the liquid above the diaphragm will flow through the channel 17, the holes 18 and the now open valve opening 9 to the outlet 3. The pressure in the chamber 6 above the diaphragm is thereby diminished and as the outflow area of the valve is so adjusted, that sufficient pressure on the lower side of the diaphragm is maintained, this surplus of pressure acts in such a way as to bend the diaphragm upwards and to raise the valve body 7 fixed to the diaphragm. Thereby the tightening against the valve seat 4 is interrupted and the liquid flows through the opening at the valve seat 4 to the outlet 3. The valve body 7, with the projection 14 of the valve spindle 12 pressed against the sleeve 15, continues to be raised owing to the surplus of pressure below the diaphragm, so that the valve spindle 12 finally impinges against the screw 22. The valve spindle is then unable to move further upwards, but the pressure on the lower side of the diaphragm continues to drive the valve body 7 upwards, as the chamber 6 above the diaphragm is still in direct communication with the outlet 3 through the groove 20, the channel 17, the holes 18 and the valve opening 9. Consequently, the valve spindle 12 is pushed downwards in relation to the valve body 7. The projection 14 is moved away from the sleeve 15, and the valve spindle 12 will fit tightly against the seat 10 in the valve body 7, as shown in Fig. 3. The chamber 6 above the diaphragm is then no longer in communication with the outlet 3, but on the other hand it is, through the hole 19 and the channel 17 in communication with the inlet 2. The pressure in the chamber 6 rises and the surplus of pressure on the lower side of the diaphragm ceases, so that the diaphragm is bent downward, according as the liquid flows into the chamber 6 through the narrow hole 19, owing to which fact the valve body 7 gradually sinks until it fits tightly against the seat 4 in the valve box.

Through the yielding capacity of the diaphragm a shock-free closing is attained.

By raising or lowering the screw 22 the valve is adjusted for allowing a predetermined quantity of liquid to pass through the same.

The invention may be carried out in other ways than that described and illustrated by way of example.

I claim:

1. A self-closing valve comprising a casing having a detachable top cap and side walls, an outlet and an inlet, a valve seat in the casing, a valve comprising a cylindrical valve body of uniform diameter from top to bottom fitting tightly against the said seat in the valve casing while the valve is closed, said valve having a top cap and a diaphragm clasped between the casing cap and its side walls and between the valve cap and cylindrical body, a valve spindle in the valve having openings therein and a passage therethrough, a stopping device for said spindle said spindle being movable axially in the valve body, and means to operate the spindle, the valve body and spindle being so arranged in relation to each other that the valve spindle after having been actuated occupies such position in the valve body that the valve is opened by the pressure of the liquid whereupon, owing to the cooperation of the valve spindle with said stopping device, the valve spindle is halted and brought to occupy such a position in the valve body that the valve is automatically closed after a predetermined quantity of liquid has been let through.

2. A self-closing valve comprising a casing having a side wall, a detachable top cap, an inlet and an outlet, a valve seat in the casing, a tubular projection extending upwardly within the casing in front of said outlet and a valve in said projection, said valve having a detachable top cap and a cylindrical body portion within the tubular projection and seating on said valve seat, a valve spindle in the valve having openings therein and passage therethrough, and means to move the same axially of the valve, and a diaphragm clasped between the valve cap and valve and between the casing cap and side walls.

In testimony whereof I have hereunto affixed my signature.

ELOF KARL HJALMAR LUNDBERG.